United States Patent
Hashimoto

(10) Patent No.: US 10,048,479 B2
(45) Date of Patent: Aug. 14, 2018

(54) LASER SCANNING MICROSCOPE

(71) Applicant: OLYMPUS CORPORATION, Hachioji-shi, Tokyo (JP)

(72) Inventor: Katsuyuki Hashimoto, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/258,677

(22) Filed: Sep. 7, 2016

(65) Prior Publication Data

US 2017/0102531 A1    Apr. 13, 2017

(30) Foreign Application Priority Data

Oct. 9, 2015 (JP) .................. 2015-201005

(51) Int. Cl.
  *G02B 21/00* (2006.01)
  *G02B 26/10* (2006.01)

(52) U.S. Cl.
  CPC ....... *G02B 21/0048* (2013.01); *G02B 26/105* (2013.01)

(58) Field of Classification Search
  CPC ...... G02B 21/00; G02B 26/10; G02B 26/105; G02B 21/0048
  See application file for complete search history.

(56) References Cited

U.S. PATENT DOCUMENTS

2012/0133888 A1 *    5/2012    Gray ............... A61B 3/1025
                                                     351/206

FOREIGN PATENT DOCUMENTS

JP         2006119643 A    5/2006

* cited by examiner

*Primary Examiner* — Jennifer D. Carruth
(74) *Attorney, Agent, or Firm* — Holtz, Holtz & Volek PC

(57) ABSTRACT

Provided is a laser scanning microscope including a scanning unit that scans laser light emitted from a light source two-dimensionally across a specimen, a light-detecting unit that detects light coming from the specimen, an information-acquiring unit that acquires information about an observation mode, and a control unit that controls the scanning unit based on the information acquired by the information-acquiring unit. The scanning unit includes a galvanometer scanner and a resonant scanner that are alternately operable. The control unit controls the scanning unit to deactivate the resonant scanner if the information acquired by the information-acquiring unit indicates an observation mode in which the galvanometer scanner is used alone and to maintain the resonant scanner in an active state if the information acquired by the information-acquiring unit indicates an observation mode in which the galvanometer scanner and the resonant scanner are alternately used.

5 Claims, 5 Drawing Sheets

LASER SCANNING MICROSCOPE

CROSS-REFERENCE TO RELATED APPLICATIONS

This application is based on Japanese Patent Application No. 2015-201005, the contents of which are incorporated herein by reference.

TECHNICAL FIELD

The present invention relates to laser scanning microscopes.

BACKGROUND ART

There is a known laser scanning microscope including a resonant scanner (see, for example, Patent Literature PTL 1). This laser scanning microscope includes a soundproof casing surrounding the resonant scanner to block an unpleasant high-pitched sound generated by the resonant scanner during the operation of the resonant scanner.

CITATION LIST

Patent Literature

{PTL 1}
Japanese Unexamined Patent Application, Publication No. 2006-119643

SUMMARY OF INVENTION

Technical Problem

A soundproof structure in which a casing surrounds a resonant scanner often requires a large, expensive system for effective soundproofing.

There are two modes of observation under a laser scanning microscope: an observation mode in which slow motions of a specimen are observed at high resolution and an observation mode in which the observation of fast motions of a specimen and high-resolution observation are alternately performed.

In the former observation mode, laser light is scanned using a galvanometer scanner alone. In the latter observation modes, scanning using a galvanometer scanner alone and scanning using a resonant scanner are alternately performed.

Since the resonant scanner is not used during scanning using the galvanometer scanner alone, no noise is generated if the resonant scanner is deactivated.

The present invention is a laser scanning microscope that allows the generation of noise by a resonant scanner to be minimized without using a large system and that does not require a long observation time.

Solution to Problem

An aspect of the present invention provides a laser scanning microscope including a scanning unit that scans laser light emitted from a light source two-dimensionally across a specimen, a light-detecting unit that detects light coming from the specimen, an information-acquiring unit that acquires information about an observation mode, and a control unit that controls the scanning unit based on the information acquired by the information-acquiring unit. The scanning unit includes a galvanometer scanner and a resonant scanner that are alternately operable. The observation mode is an observation mode in which the galvanometer scanner is used alone or an observation mode in which the galvanometer scanner and the resonant scanner are alternately used. The control unit controls the scanning unit to deactivate the resonant scanner if the information acquired by the information-acquiring unit indicates the observation mode in which the galvanometer scanner is used alone and to maintain the resonant scanner in an active state if the information acquired by the information-acquiring unit indicates the observation mode in which the galvanometer scanner and the resonant scanner are alternately used.

In the above aspect, the information-acquiring unit may include an input unit that allows a user to input the observation mode.

In the above aspect, the observation mode may be input via the input unit upon activation of the laser scanning microscope.

In the above aspect, information about an observation mode for next activation of the laser scanning microscope may be input via the input unit and may be stored in a storage unit in advance, and the information-acquiring unit may acquire the information about the observation mode from the storage unit upon the next activation of the laser scanning microscope.

In the above aspect, the information-acquiring unit may include a user-information acquiring unit that acquires user information and a storage unit that stores the user information acquired by the user-information acquiring unit in association with the observation mode.

In the above aspect, the laser scanning microscope may further include a display unit that displays that observation using the resonant scanner is active or inactive and, if the information-acquiring unit acquires information indicating switching from the observation mode in which the galvanometer scanner is used alone to the observation mode in which the galvanometer scanner and the resonant scanner are alternately used, the control unit may activate the resonant scanner and may display that the resonant scanner is active on the display unit after a predetermined time elapses from the activation.

Advantageous Effects of Invention

The present invention has the advantage of allowing the generation of noise by a resonant scanner to be minimized without using a large system and not requiring a long observation time.

DESCRIPTION OF EMBODIMENTS

A laser scanning microscope 1 according to an embodiment of the present invention will be described below with reference to the drawings.

Figure 1:
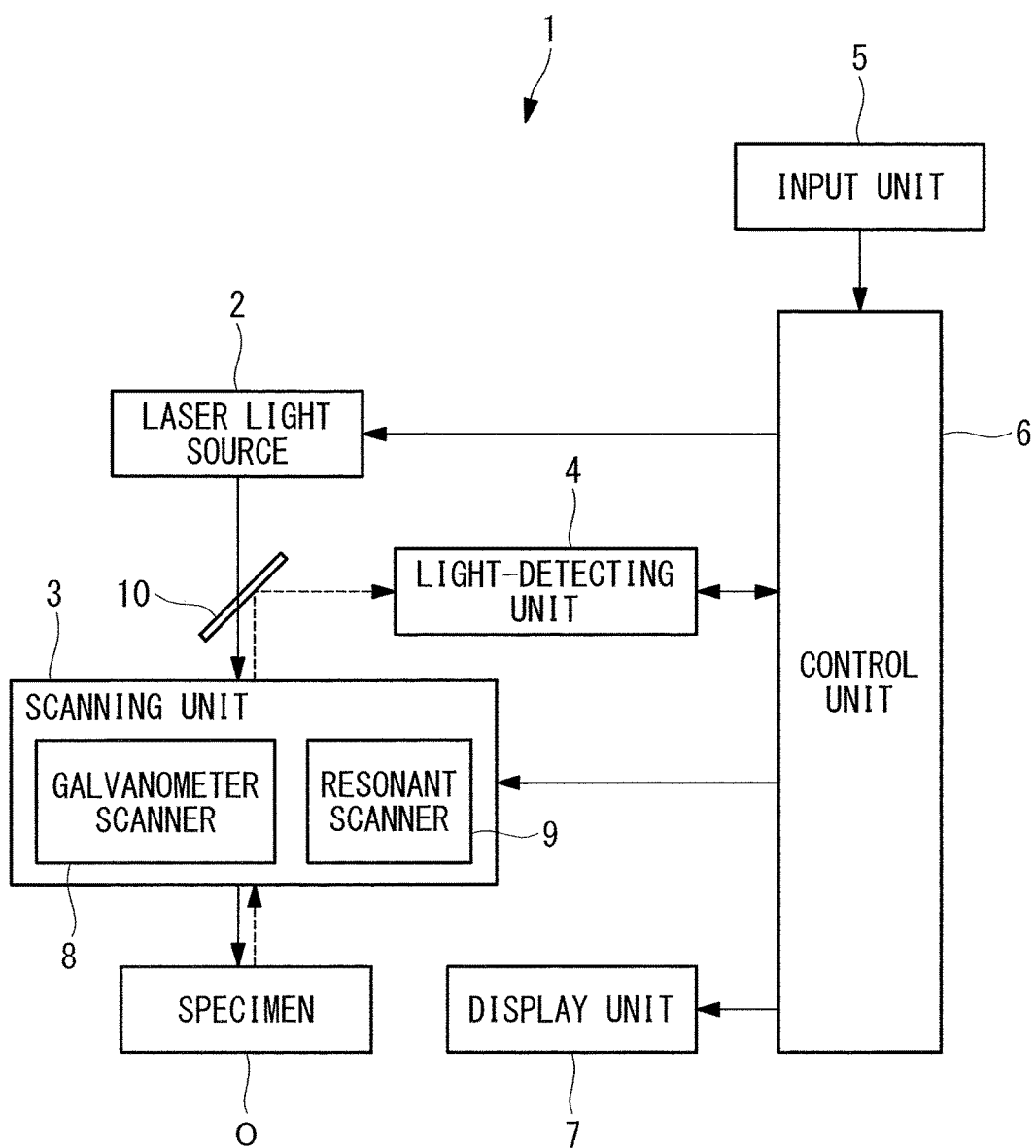
FIG. 1 is a block diagram showing a laser scanning microscope according to an embodiment of the present invention.

As shown in FIG. 1, the laser scanning microscope 1 according to this embodiment includes a laser light source (light source) 2 that emits laser light; a scanning unit 3 that scans the laser light emitted from the laser light source 2 across a specimen O; a light-detecting unit 4 that detects fluorescence emitted from the specimen O as the laser light is scanned thereacross by the scanning unit 3; an information-acquiring unit including an input unit 5 via which an observation mode is input; a control unit 6 that controls the scanning unit 3 depending on the observation mode input via the input unit 5; and a display unit 7 that displays an image generated by associating the intensity of the fluorescence acquired by the light-detecting unit 4 with the scan position of the scanning unit 3.

The scanning unit 3 includes a galvanometer scanner 8 and a resonant scanner 9 that are alternately used. The galvanometer scanner 8 includes two galvanometer mirrors (not shown) that are disposed close to each other and that can be rotated in two orthogonal planes of rotation. The galvanometer mirrors can be rotated at relatively low speed (e.g., 512 Hz in the X direction and 2 Hz in the Y direction) to scan the laser light across the specimen O at relatively low speed.

The resonant scanner 9 includes one galvanometer mirror (not shown) and one resonant mirror (not shown) that are disposed close to each other and that can be rotated in two orthogonal planes of rotation. The resonant scanner 9 can scan the laser light across the specimen O at high speed (e.g., 8 kHz) in the main scan direction (X direction) and at relatively low speed (e.g., 500 Hz) in the sub-scan direction (Y direction).

The light-detecting unit 4 includes, for example, a photomultiplier (not shown) and can output a current depending on the intensity of the detected fluorescence. The light-detecting unit 4 includes an amplifier that amplifies a current signal output from the photomultiplier depending on a command signal received from the control unit 6.

The information-acquiring unit acquires information about the observation mode. The input unit 5 is an input device for user input. Upon activation of the laser scanning microscope 1, the control unit 6 displays the menu shown in FIG. 2 on the display unit 7 and prompts the user to select and input, as the observation mode for the observation to be performed, the observation mode in which the galvanometer scanner 8 is used alone or the observation mode in which the galvanometer scanner 8 and the resonant scanner 9 are alternately used.

The control unit 6 controls the scanning unit 3 depending on the observation mode input via the input unit 5 (information acquired by the information-acquiring unit). Specifically, the control unit 6 controls the scanning unit 3 to deactivate the resonant scanner 9 if the input observation mode is the observation mode in which the galvanometer scanner 8 is used alone, i.e., the resonant scanner 9 is not used, and to activate the resonant scanner 9 if the input observation mode is the observation mode in which the galvanometer scanner 8 and the resonant scanner 9 are alternately used.

The control unit 6 includes an interface circuit (not shown) that communicates signals with the laser light source 2, the scanning unit 3, the light-detecting unit 4, the input unit 5, and the display unit 7; a storage unit (memory, not shown) that stores various programs, such as a light exposure control program, a scanning-unit control program, a detector control program, and an observation-condition determination program, and the fluorescence image information acquired by the light-detecting unit 4; and a CPU (not shown) that executes a program read from the storage unit (memory).

In FIG. 1, reference sign 10 denotes a dichroic mirror.

The operation of the thus-configured laser scanning microscope 1 according to this embodiment will be described below.

Figure 3:
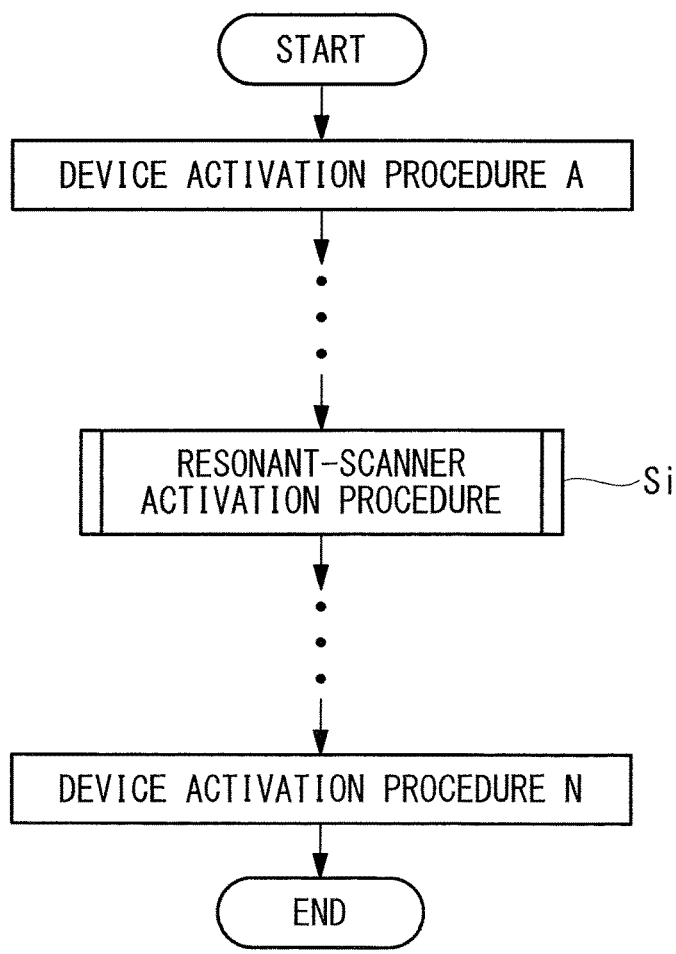
FIG. 3 is a flowchart illustrating the activation process of the laser scanning microscope in FIG. 1.

As shown in FIG. 3, when the user powers up the laser scanning microscope 1 according to this embodiment to activate the laser scanning microscope 1 for the fluorescence observation of the specimen O under the laser scanning microscope 1, the control unit 6 executes device activation procedures A to N, including a resonant-scanner activation procedure Si.

Figure 2:
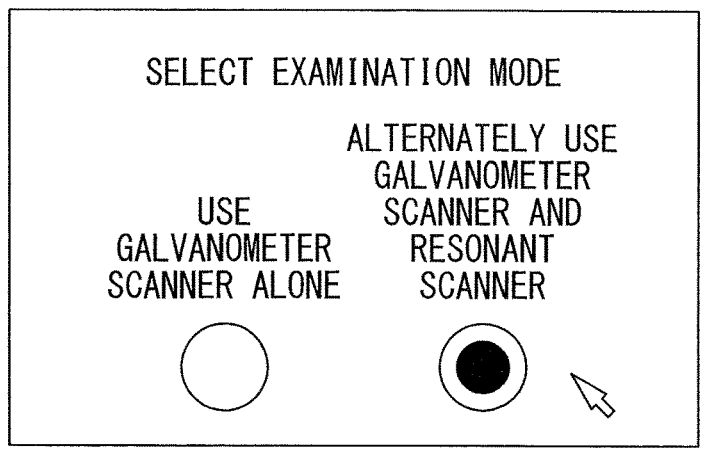
FIG. 2 is a diagram showing an example observation mode selection menu displayed upon activation of the laser scanning microscope in FIG. 1.
Figure 4:
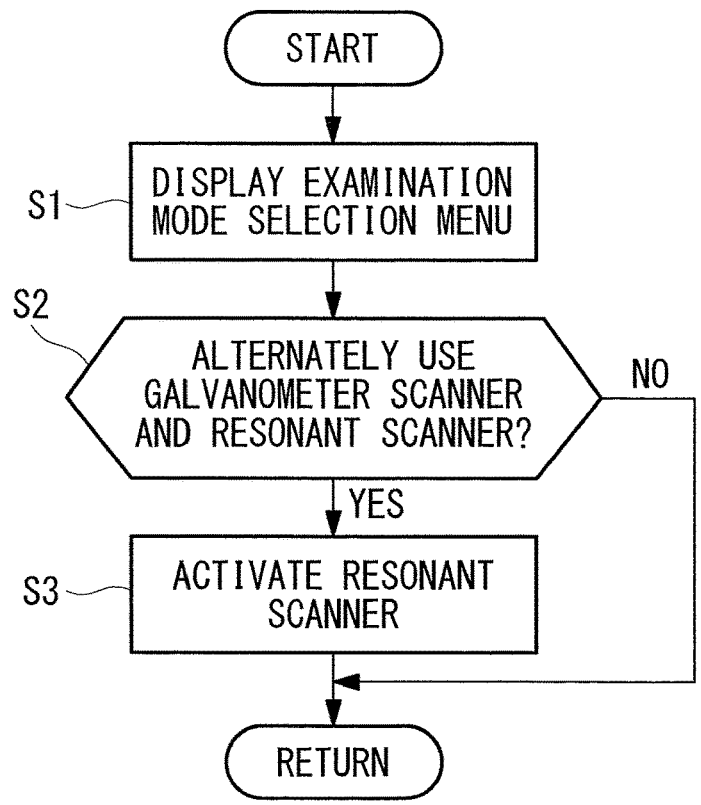
FIG. 4 is a flowchart illustrating a resonant-scanner activation procedure included in the activation process in FIG. 3.

In the resonant-scanner activation procedure Si, as shown in FIG. 4, the control unit 6 displays the menu shown in FIG. 2 on the display unit 7 and prompts the user to input the observation mode (step S1). The control unit 6 determines whether the user has selected the observation mode in which the galvanometer scanner 8 and the resonant scanner 9 are alternately used (step S2). If that mode has been selected, the control unit 6 controls the scanning unit 3 to activate the resonant scanner 9 (step S3). If the user has selected the observation mode in which the galvanometer scanner 8 is used alone, the control unit 6 controls the scanning unit 3 to maintain the resonant scanner 9 in an inactive state. The resonant-scanner activation procedure Si is thus completed.

Observation is started after the remaining device activation procedures A to N are completed.

The thus-configured laser scanning microscope 1 according to this embodiment maintains the resonant scanner 9 in an inactive state if the observation mode is input and the observation mode in which the galvanometer scanner 8 is used alone is selected. This reliably prevents the generation of an unpleasant high-pitched sound by the resonant scanner 9 without using a large system.

The laser scanning microscope 1 activates the resonant scanner 9 if the observation mode is input upon activation of the laser scanning microscope 1 and the observation mode in which the galvanometer scanner 8 and the resonant scanner 9 are alternately used is selected. This allows the operating condition of the resonant scanner 9 to be stabilized before activation of all devices of the laser scanning microscope 1 is completed. Although a high-pitched sound is generated in this case, simple soundproofing allows checking that the resonant scanner 9 is active.

In the observation mode in which the galvanometer scanner 8 and the resonant scanner 9 are alternately used, the resonant scanner 9 may be maintained in an active state so that the resonant scanner 9 can be maintained in a stable operating condition when observation using the galvanometer scanner 8 alone is switched to observation using the resonant scanner 9. This eliminates the time to wait for stabilization and thus provides the advantage of shortening the observation time.

Figure 5:
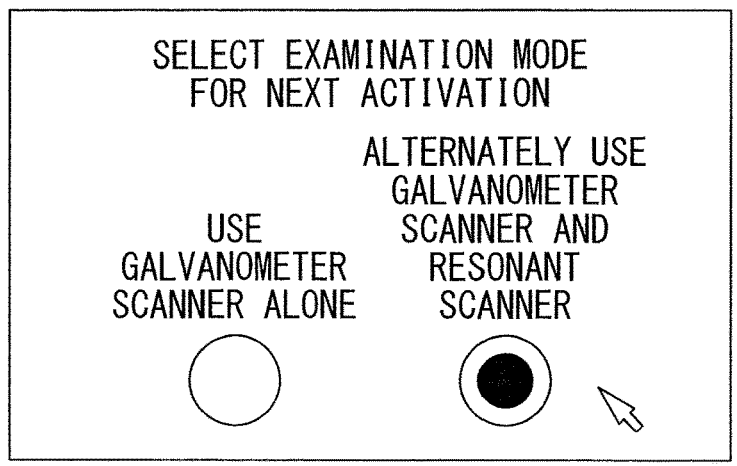
FIG. 5 is a diagram showing a modification of the observation mode selection menu displayed upon activation of the laser scanning microscope in FIG. 1.
Figure 6:
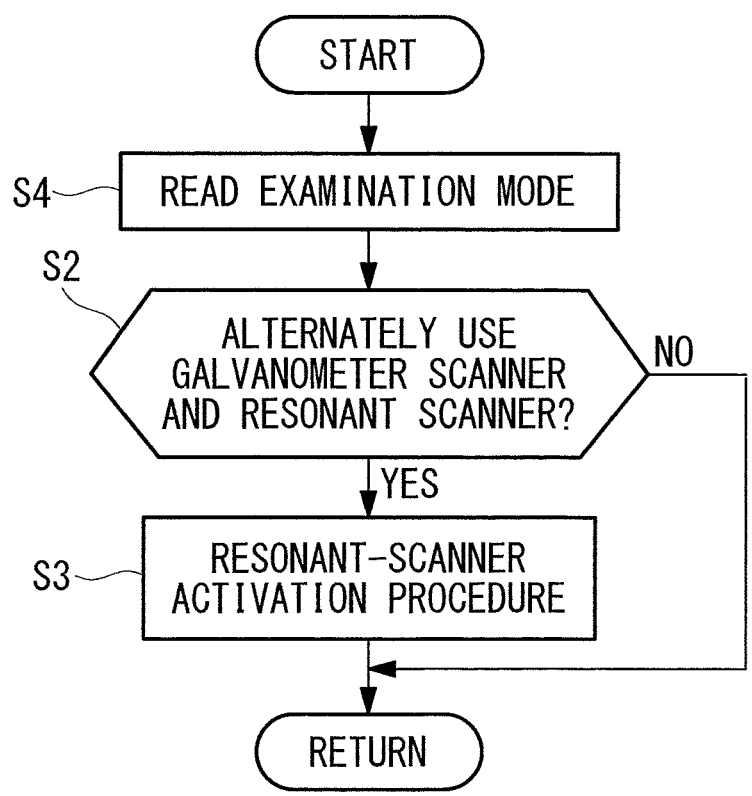
FIG. 6 is a flowchart illustrating a resonant-scanner activation procedure in the case of FIG. 5.

In this embodiment, the user inputs the observation mode via the input unit 5 upon activation of the laser scanning microscope 1; instead, as shown in FIG. 5, if the user knows the observation mode for the next observation, he or she may input the observation mode for the next activation via the input unit 5, and the input information may be stored in the memory (storage unit, not shown). As shown in FIG. 6, upon the next activation of the laser scanning microscope 1, the information-acquiring unit may read the information from the memory (storage unit) (step S4), and the control unit 6 may select the activation or deactivation of the resonant scanner 9 based on the read information and may execute the selected procedure without prompting the user to input the observation mode.

Figure 7:
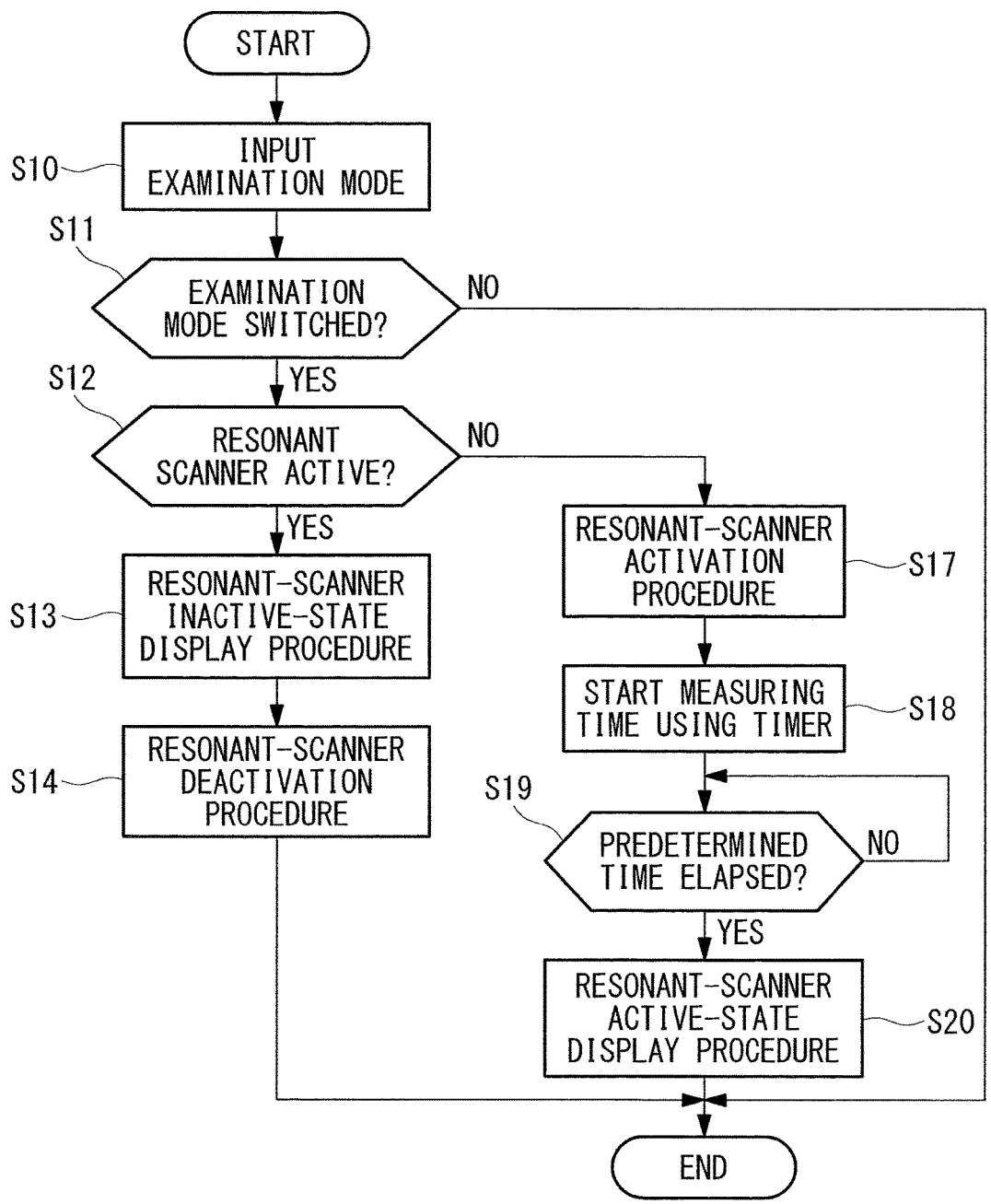
FIG. 7 is a flowchart illustrating the process of switching the observation mode upon activation of a modification of the laser scanning microscope in FIG. 1.

As shown in FIG. 7, if the user inputs the observation mode (step S10) to trigger the switching of the observation mode during observation under the laser scanning microscope 1, the control unit 6 may select the activation or deactivation of the resonant scanner 9 and may execute the selected procedure. Specifically, in step S10, the user inputs the observation mode in which the galvanometer scanner 8 is used alone or the observation mode in which the galvanometer scanner 8 and the resonant scanner 9 are alternately used and, in step S1, it is determined whether the observation mode needs to be switched based on the input observation mode. If it is determined that the observation mode need not be switched, the same state is maintained. If it is determined that the observation mode needs to be switched, it is determined whether the resonant scanner 9 is currently active in step S12, and the control unit 6 selects the activation or deactivation of the resonant scanner 9 and executes the selected procedure.

For example, during observation using the galvanometer scanner 8 and the resonant scanner 9 alternately, the display unit 7 displays that the resonant scanner 9 is active. In this state, if it is determined that switching to the observation mode in which the galvanometer scanner 8 is used alone is input (step S11), it is determined that the resonant scanner 9 is active (step S12), and the control unit 6 may execute a procedure for displaying that the resonant scanner 9 is inactive (step S13) and may then execute a procedure for deactivating the resonant scanner 9 (step S14).

The procedure for displaying that the resonant scanner 9 is inactive is executed by displaying that the resonant scanner 9 is inactive on the display unit 7. This inactive-state display procedure prevents the user from selecting observation using the resonant scanner 9. The resonant scanner 9 can be deactivated to prevent the generation of a high-pitched sound. The galvanometer scanner 8 is maintained in an active state for observation after the inactive-state display procedure.

During observation using the galvanometer scanner 8 alone, the display unit 7 displays that the resonant scanner 9 is inactive. In this state, if it is determined that switching to the observation mode in which the galvanometer scanner 8 and the resonant scanner 9 are alternately used is input (step S11), it is determined that the resonant scanner 9 is inactive (step S12), and the control unit 6 activates the resonant scanner 9 (step S17) and starts measuring time using a timer (not shown) (step S18). When a predetermined time elapses after the control unit 6 starts measuring time using the timer (step S19), the control unit 6 executes a procedure for displaying that the resonant scanner 9 is active (step S20).

The active-state display procedure is executed by displaying that the resonant scanner 9 is active on the display unit 7. This allows the user to perform observation using the galvanometer scanner 8, for example, for image searching, during the period of time to wait for the stabilization of the resonant scanner 9 from the activation of the resonant scanner 9 until a predetermined time elapses (i.e., the period of time to display that the resonant scanner 9 is inactive). The active-state display procedure may be executed after a predetermined time elapses from the activation of the resonant scanner 9 so that the user can select observation using the resonant scanner 9 while the resonant scanner 9 is in a stable operating condition.

Even if the observation mode is changed during one observation process, the observation can be continued in a different observation mode without reactivating the laser scanning microscope 1.

In this embodiment, instead of inputting the observation mode via the input unit 5, an observation condition file created in advance may be stored in the memory (storage unit) and, upon activation of the laser scanning microscope 1, the control unit 6 may read the observation mode from the observation condition file and may control the scanning unit 3 based on the read observation mode. This provides the advantage of eliminating the need for inputting the settings each time the laser scanning microscope 1 is activated.

The information-acquiring unit may include a user-information acquiring unit (not shown) that acquires information about the user who performs observation under the laser scanning microscope 1 and a memory (storage unit, not shown) that stores the user information in association with the observation mode so that the observation mode can be switched depending on the user.

Since it is often the case that each user always uses the same observation mode, the need for inputting the settings for each activation can be eliminated simply by acquiring the user information.

The user-information acquiring unit may be any input means such as a barcode reader or keyboard. The user information may be a login ID that is input, for example, during PC startup.

In one aspect of the laser scanning microscope according to the embodiment described above, the control unit controls the scanning unit based on information about the observation mode acquired by the information-acquiring unit. The control unit switches the scanning unit to the galvanometer scanner and deactivates the resonant scanner if the acquired information indicates the observation mode in which the galvanometer scanner is used alone. The control unit maintains the resonant scanner in an active state if the information acquired by the information-acquiring unit indicates the observation mode in which the galvanometer scanner and the resonant scanner are alternately used.

In this way, the resonant scanner can be deactivated in the observation mode in which the galvanometer scanner is used alone to prevent the generation of an unpleasant high-pitched sound and can be maintained in an active state in the observation mode in which the resonant scanner is used to stabilize its operation so that observation can be performed within a shorter period of time even if the galvanometer scanner and the resonant scanner are alternately used.

The information-acquiring unit may include an input unit that allows a user to input the observation mode.

When the user inputs the observation mode via the input unit, the resonant scanner is maintained in an active state if the input observation mode is the observation mode in which the galvanometer scanner and the resonant scanner are alternately used and is deactivated if the input observation mode is the observation mode in which the galvanometer scanner is used alone.

The observation mode may be input via the input unit either upon activation of the laser scanning microscope or during observation. If the observation mode is input upon activation, the time required for the activation process can be used to stabilize the operating condition of the resonant scanner, which contributes to saving time. If the observation mode is input during observation, the observation mode can be readily switched during observation without reactivation.

The observation mode may be input via the input unit upon activation of the laser scanning microscope.

The resonant scanner is activated if the observation mode in which the galvanometer scanner and the resonant scanner are alternately used is selected. The operating condition of the resonant scanner can be stabilized before activation of all devices of the laser scanning microscope is completed.

Information about an observation mode for next activation of the laser scanning microscope may be input via the input unit and may be stored in a storage unit in advance, and the information-acquiring unit may acquire the information about the observation mode from the storage unit upon the next activation of the laser scanning microscope.

If information about the observation mode for the next observation is known in advance, that information may be stored to eliminate the need for inputting the settings for each activation.

In the above aspect, the information-acquiring unit may include a user-information acquiring unit that acquires user information and a storage unit that stores the user information acquired by the user-information acquiring unit in association with the observation mode.

In this case, if each user always uses the same observation mode, the information-acquiring unit may acquire the information about the observation mode stored in the storage unit in association with the user information acquired by the user-information acquiring unit. This eliminates the need for inputting the settings for each activation.

In the above aspect, the laser scanning microscope may further include a display unit that displays that observation using the resonant scanner is active or inactive and, if the information-acquiring unit acquires information indicating switching from the observation mode in which the galvanometer scanner is used alone to the observation mode in which the galvanometer scanner and the resonant scanner are alternately used, the control unit may activate the resonant scanner and may display that the resonant scanner is active on the display unit after a predetermined time elapses from the activation.

In this case, if the observation mode in which the galvanometer scanner and the resonant scanner are alternately used is selected, the galvanometer scanner can be used until the operating condition of the resonant scanner is stabilized. This allows images to be acquired using the galvanometer scanner without using the resonant scanner. The display unit may display that the resonant scanner is active after a predetermined time elapses. This allows images to be acquired using the resonant scanner in a stable operating condition.

REFERENCE SIGNS LIST 1 laser scanning microscope
2 laser light source (light source)
3 scanning unit
4 light-detecting unit
input unit
6 control unit
7 display unit
8 galvanometer scanner
9 resonant scanner
O specimen

The invention claimed is:

1. A laser scanning microscope comprising:
a scanning unit that scans laser light emitted from a light source two-dimensionally across a specimen;
a light-detecting unit that detects light coming from the specimen;
an information-acquiring unit that acquires information about an observation mode; and
a control unit that controls the scanning unit based on the information acquired by the information-acquiring unit,
wherein:
the information-acquiring unit comprises an input unit via which a user inputs the observation mode,
the scanning unit comprises a galvanometer scanner and a resonant scanner that are alternately operable,
the galvanometer scanner includes two galvanometer mirrors that are disposed close to each other and that are rotatable in two orthogonal planes of rotation,
the resonant scanner includes one galvanometer mirror and one resonant mirror that are disposed close to each other and that are rotatable in two orthogonal planes of rotation,
the observation mode is one of a first observation mode in which the resonant scanner is deactivated and the galvanometer scanner is used alone and a second observation mode in which the resonant scanner is activated and the galvanometer scanner and the resonant scanner are alternately used, and
the control unit controls the scanning unit to deactivate the resonant scanner if the information acquired by the information-acquiring unit indicates the first observation mode, and to maintain the resonant scanner in an active state if the information acquired by the information-acquiring unit indicates the second observation mode.

2. The laser scanning microscope according to claim 1, wherein the observation mode is input via the input unit upon activation of the laser scanning microscope.

3. The laser scanning microscope according to claim 1, wherein:
information about an observation mode for next activation of the laser scanning microscope is input via the input unit and is stored in a storage unit in advance, and
the information-acquiring unit acquires the information about the observation mode from the storage unit upon the next activation of the laser scanning microscope.

4. The laser scanning microscope according to claim 1, wherein the information-acquiring unit further comprises a user-information acquiring unit that acquires user information and a storage unit that stores the user information acquired by the user-information acquiring unit in association with the observation mode.

5. The laser scanning microscope according to claim 1, further comprising a display unit that displays whether observation using the resonant scanner is active or inactive,
wherein, if the information-acquiring unit acquires information indicating switching from the first observation mode to the second observation mode, the control unit activates the resonant scanner and displays that the resonant scanner is active on the display unit after a predetermined time elapses from the activation.

* * * * *